(12) United States Patent
Hirth et al.

(10) Patent No.: US 9,301,029 B2
(45) Date of Patent: Mar. 29, 2016

(54) DATA RATE CONTROL IN AN OPTICAL LINE TERMINAL

(71) Applicant: BROADCOM CORPORATION, Irvine, CA (US)

(72) Inventors: Ryan Hirth, Windsor, CA (US); Mark Griswold, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 352 days.

(21) Appl. No.: 13/669,272

(22) Filed: Nov. 5, 2012

(65) Prior Publication Data

US 2014/0126907 A1 May 8, 2014

(51) Int. Cl.
*H04J 14/00* (2006.01)
*H04Q 11/00* (2006.01)

(52) U.S. Cl.
CPC ... *H04Q 11/0062* (2013.01); *H04Q 2011/0064* (2013.01); *H04Q 2011/0077* (2013.01)

(58) Field of Classification Search
CPC .................................................. H04J 14/0246
See application file for complete search history.

(56) References Cited

U.S. PATENT DOCUMENTS

| 6,907,001 | B1 * | 6/2005 | Nakayama et al. | 370/230 |
| 7,991,296 | B1 * | 8/2011 | Johnston et al. | 398/154 |
| 2006/0092833 | A1 * | 5/2006 | Bemmel et al. | 370/229 |
| 2009/0252492 | A1 * | 10/2009 | Sone et al. | 398/49 |
| 2010/0254706 | A1 | 10/2010 | Hirth et al. | |
| 2011/0182588 | A1 | 7/2011 | Wojtowicz | |
| 2012/0294611 | A1 * | 11/2012 | Adler et al. | 398/45 |
| 2013/0039182 | A1 * | 2/2013 | Das et al. | 370/235 |
| 2013/0088969 | A1 * | 4/2013 | Mukherjee et al. | 370/236 |

FOREIGN PATENT DOCUMENTS

WO  WO-2007099045 A1  9/2007

OTHER PUBLICATIONS

"EPON Technology White Paper", GW Technologies Co., Ltd., last viewed Jan. 23, 2013, retrieved from <http://www.argo-contar.com/solutions/EPON%20Technology%20White%20Paper.pdf>.
"10G EPON—Unleashing the Bandwidth Potential", ZTE Corporation, 2009.
Kramer, "On Configuring Logical Links in EPON", last viewed Jan. 23, 2013, retrieved from <http://glenkramer.com/ucdavis/papers/llid_config.pdf>.

(Continued)

*Primary Examiner* — Shi K Li
*Assistant Examiner* — Mina Shalaby
(74) *Attorney, Agent, or Firm* — McDermott Will & Emery LLP

(57) ABSTRACT

A data rate control system for an optical line terminal (OLT) may include a processor, an OLT Medium Access Control (MAC) device that includes passive optical network (PON) ports that are mapped to identifiers, and a switch device coupled to the OLT MAC device. The OLT MAC device may determine that a PON port is congested, and may transmit a message to the switch device indicates the congestion at the PON port based on the mapped identifier. The switch device may transmit data items to the OLT MAC device for transmission over the PON ports at data rates respective to the PON ports, may receive the message, and may reduce the rate at which the data items are being transmitted to the OLT MAC device for transmission over the congested PON port without changing the rates at which other data items are being transmitted to the OLT MAC device.

20 Claims, 8 Drawing Sheets

(56) References Cited

OTHER PUBLICATIONS

"Optical line termination", Wikipedia—The Free Encyclopedia, last viewed Jul. 12, 2012, retrieved from <http://en.wikipedia.org/w/index.php?title=Optical_line_termination&printable=yes>.

"Ethernet Passive Optical Network (EPON) Tutorial", Ethernet in the First Mile Alliance, Jun. 2004.

Miyazaki, et al., "MAC LSI Design Technology for Optical Access Communication", NTT Technical Review, Mar. 2011, vol. 9, No. 3.

"White Paper—Custom NPUs for Broadband Access Line Cards", Altera—Ethernity Networks, Dec. 2007, Version 1.0.

Lallukka, et al., "Passive Optical Networks—Transport Concepts", VTT Publications 597, 2006.

"Ethernet in the First Mile—Frequently Asked Questions", last viewed Jul. 12, 2012, retrieved from <http://www.ethernetinthefirstmile.com/faq_pon.html>.

"Fiber to the x", Wikipedia—The Free Encyclopedia, last viewed Jul. 12, 2012, retrieved from <http://en.wikipedia.org/w/index.php?title=Fiber_to_the_x&printable=yes>.

"Implementing Next-Generation Passive Optical Network Designs with FPGAs", Altera Corporation, May 2012.

"Operating the EPON protocol over Coaxial Distribution Networks Call for Interest", IEEE 802.3 Ethernet Working Group, Nov. 8, 2011.

Smith, "Communications Processors vs. Network Processors: Programmable Data Plane Approaches", RTC Magazine, last viewed Jul. 25, 2012, retrieved from <http://www.rtcmagazine.com/articles/print_article/100479>.

Khermosh, "Managed Objects of Ethernet Passive Optical Networks (EPON)", PMC-SIERRA, Jul. 2007.

Kramer, et al., "8—Ethernet Passive Optical Network (EPON)", last viewed Jan. 23, 2013, retrieved from <http://users.encs.concordia.ca/~assi/courses/encs6811/epon_wiley.pdf>.

"Smooth Evolution of EPON to 10G EPON", ZTE Technologies, Jan. 12, 2010, retrieved from <http://wwwen.zte.com/endata/magazine/ztetechnologies/2009year/no9/articles/.../t20100112_179553.html>.

"Passive optical network," Wikipedia—The Free Encyclopedia, last viewed Jul. 12, 2012, retrieved from <http://en.wikipedia.org/w/index.php?title=Passive_optical_network&printable=yes>.

"Priority Flow Control: Build Reliable Layer 2 Infrastructure", Cisco Systems, Inc. 2009, pp. 1-8.

"Ethernet Flow Control" retrieved from <http://en.wikipedia.org/w/index.php?title=Ethernet_flow_control&oldid=499466007>, last modified on Jun. 26, 2012, 4 pages.

* cited by examiner

DATA RATE CONTROL IN AN OPTICAL LINE TERMINAL

TECHNICAL FIELD

The present description relates generally to data rate control, and more particularly, but not exclusively, to data rate control in an optical line terminal (OLT).

BACKGROUND

Passive Optical Networks (PONs), such as Ethernet Passive Optical Networks (EPONs), are increasingly being deployed to satisfy the growth in residential and commercial demand for bandwidth intensive services, e.g. broadband internet access. An EPON generally consists of optical line terminal (OLT) equipment in a central office and multiple optical network units (ONUs) in the field, that are all connected by a passive optical connection. The ONUs may each couple customer equipment of one or more residential or commercial subscribers to the EPON, such that the subscribers may receive bandwidth intensive services, while the OLT equipment may provide flow classification, modification, and quality of service functions for the entire EPON. In some instances, the OLT equipment may be coupled to a backplane or other uplink, such as through an Internet Service Provider (ISP).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
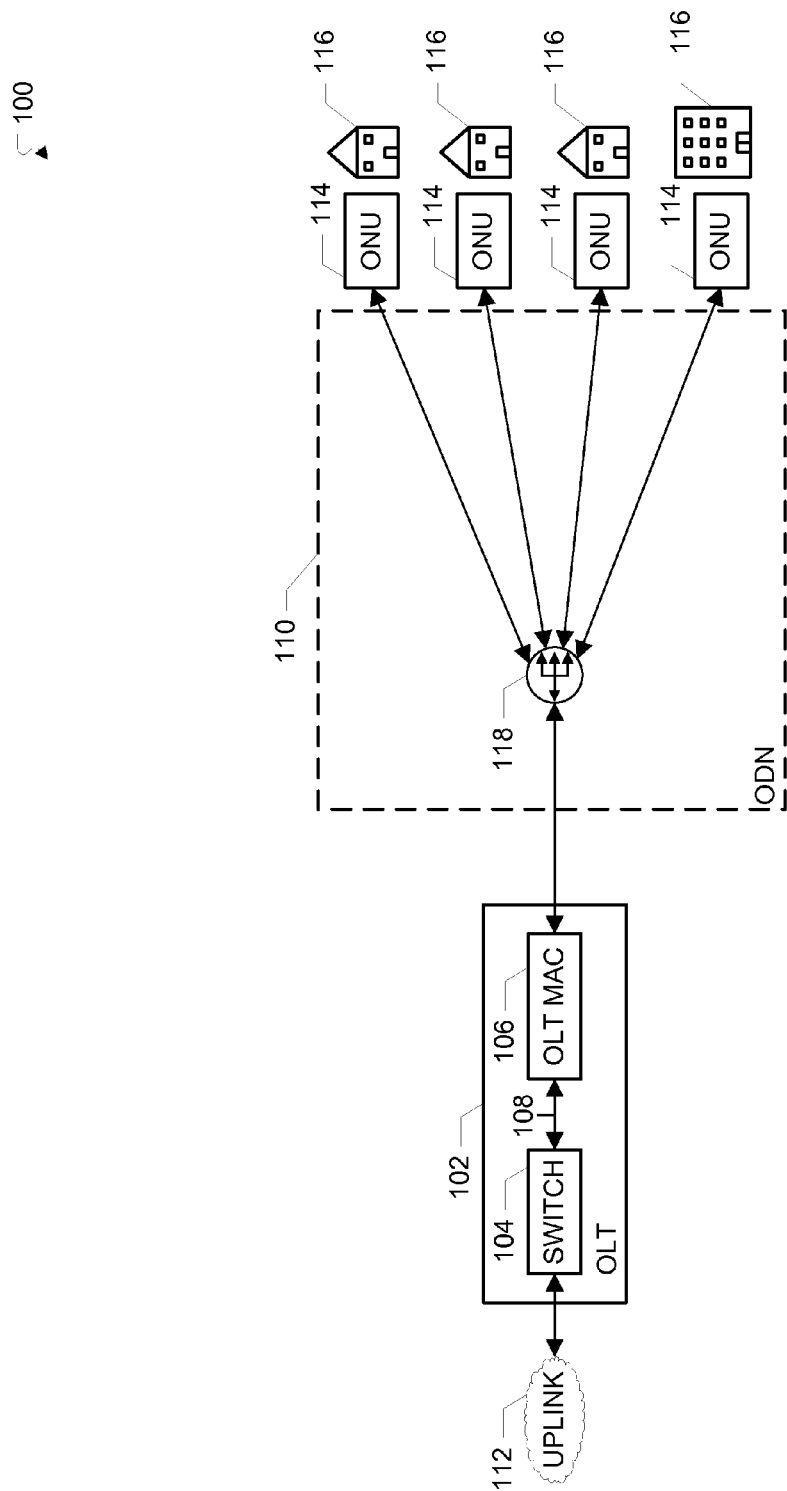
FIG. 1 illustrates an example network environment in which a system for data rate control in an optical line terminal may be implemented in accordance with one or more implementations.

FIG. 1 illustrates an example network environment 100 in which a system for data rate control in an optical line terminal may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 includes a passive optical network (PON) environment, such as an Ethernet passive optical network (EPON), a gigabit passive optical network (GPON), or generally any PON. The network environment 100 includes an optical line terminal (OLT) 102, at least one optical distribution network (ODN) 110, one or more optical network units (ONUs) 114, an uplink 112, and customer premises 116. The ODN 110 includes optical fibers, one or more optical splitters 118, such as passive optical splitters, and/or other optical routing devices. The optical splitters 118 split a downstream optical signal such that effectively the same downstream signal is transmitted to the ONUs 114. The ODN 110 includes, but is not limited to, any loop-free network topology.

The ONUs 114 may be located at, or within several miles of, the customer premises 116. The ONUs 114 transform incoming optical signals from the OLT 102 into electrical signals that are used by networking and/or computing equipment at the customer premises 116. An ONU 114 may service a single customer or multiple customers at the customer premises 116. Since the ONUs 114 receive the same downstream signal, an ONU 114 is associated with at least one logical link identifier (LLID), such as a 15-bit LLID, that is included in data packets transmitted between the ONUs 114 and the OLT 102, such that data traffic transmitted to/from the ONUs 114 can be differentiated. In one or more implementations, a customer that is receiving service from an ONU 114 may be associated with one or more LLIDs. In this instance, the LLID of the customer may be included in data traffic corresponding to the customer that is transmitted to/from the ONU 114 and the OLT 102.

In one or more implementations, the LLIDs may be categorized based on whether the LLIDs are associated with data traffic that is transmitted for a committed information rate (CIR) or data traffic that is transmitted for an excess information rate (EIR). The CIR may refer to an average bandwidth of data traffic that is guaranteed by a service provider to one or more of the customer premises 116, such as through a service agreement with a provider operating the OLT 102. The EIR may refer to excess bandwidth that the service provider will try to provide to one or more of the customer premises 116, such as when the excess bandwidth is available.

The customer premises 116 represents at least a portion of residential and/or commercial properties that are connected to the uplink 112 through the ONUs 114, the ODN 110, and the OLT 102. A customer premises 116 may include one or more electronic devices, such as laptop or desktop computers, smartphones, personal digital assistants ("PDAs"), portable media players, set-top boxes, tablet computers, televisions or other displays with one or more processors coupled thereto and/or embedded therein, and/or any other devices that include, or are coupled to, a network interface. A customer premises 116 may also be associated with, and/or may include, networking devices, such as routers, switches, and/or any other networking devices, that may interface with an ONU 114. In one or more implementations, one or more of the networking devices associated with a customer premises 116 may interface with an ONU 114 externally to the customer premises 116, such as several miles from the customer premises 116. In this instance, the external networking devices may be connected to the customer premises 116 via copper technologies, such as wired Ethernet.

The uplink 112 may be a public communication network (such as the Internet, cellular data network, dialup modems over a telephone network) or a private communications network (such as private local area network ("LAN"), leased lines). The uplink 112 may also include, but is not limited to, any one or more of the following network topologies, including a bus network, a star network, a ring network, a mesh network, a star-bus network, a tree or hierarchical network, and the like. The uplink 112 may be connected to the OLT 102 via a network-to-network interface (NNI).

The OLT 102 may be located in a central office, such as a central office of a service provider. The OLT 102 provides an interface between the ONUs 114 and the uplink 112, such as by transforming between the optical signals used by the ONUs 114 and the electrical signals used by the uplink 112. The OLT 102 may support multiple upstream and downstream data rates, such as 1 gigabit per second (1 G), 10 gigabits per second (10 G), and/or any other transmission rates. The OLT 102 may include an OLT MAC device 106 and a switch device 104 that are communicatively coupled, such as by a link 108 through a single physical port. The OLT MAC device 106 may include, or may be coupled to, one or more PON ports that may transmit data to, and receive data from, one or more ONUs 114 at one of the data rates supported by the OLT 102, such as 1 Gbit/s (1 G), 10 Gbit/s (10 G), etc. The OLT MAC device 106 may perform OLT specific tasks, such as EPON interface functions, e.g. EPON MAC, EPON diagnostic functions, and/or EPON upstream bandwidth scheduling, and the switch device 104 may perform switching tasks of the OLT 102, such as flow classification, packet forwarding, and/or packet modification. The OLT MAC device 106 and the switch device 104 may be separate devices, e.g. separate integrated circuits (ICs), separate pluggable modules, and/or separate line cards, that communicate over the link 108, e.g. a standard Ethernet interface.

In one or more implementations, the uplink 112 may be, or may include, a connection to a second switch device in the same network node as the OLT 102, e.g. the switch device and OLT MAC device of the OLT 102 may be on a line card of a chassis, and the second switch device may be on an uplink card or other central switching card of the chassis. The second switch device may be connected to the public communication network. In these one or more implementations, a high level of oversubscription may be provided between the connected ODNs 110 and the public communication network.

The switch device 104 of the OLT 102 may transmit data traffic to/from the OLT 102 and the uplink 112, and the OLT MAC device 106 of the OLT 102 may transmit data traffic to/from the OLT 102 and the ONUs 114. The downstream data traffic, e.g. from the uplink 112, may be communicated from the switch device 104 to the OLT MAC device 106 (and subsequently to the ONUs 114) over the link 108, and the upstream data traffic, e.g. from the ONUs 114, can be communicated from the OLT MAC device 106 to the switch device 104 (and subsequently to the uplink 112) over the link 108. Since the downstream data traffic from the OLT MAC device 106 may be forwarded to all of the ONUs 114 that are connected to a given PON port (e.g. through one or more optical splitters 118), the OLT MAC device 106 may effectively broadcast the downstream data traffic to all of the ONUs 114. The individual ONUs 114 may filter out received downstream data traffic that is intended for other ONUs 114, such as by filtering out traffic that includes an LLID that is not serviced by the ONU 114.

However, since upstream data traffic transmitted by the ONUs 114 to the OLT MAC device 106 shares the same network medium, there may be collisions of upstream data traffic if two or more of the ONUs 114 transmit upstream data traffic simultaneously. Thus, in order to avoid collisions between the upstream data traffic transmitted by the ONUs 114, the OLT MAC device 106 may schedule the upstream data traffic transmitted by the ONUs 114. The scheduling of the upstream data traffic by the OLT MAC device 106 may be referred to as dynamic bandwidth allocation (DBA) and may be performed by a scheduler of the OLT MAC device 106, such as a DBA scheduler. In one or more implementations, the OLT MAC device 106 may utilize a time division multiple access (TDMA) protocol to schedule upstream data traffic transmitted by the ONUs 114. The OLT MAC device 106 may transmit the bandwidth allocations, or grants, to the ONUs 114 and the ONUs may transmit upstream data traffic in accordance with the received bandwidth allocations. In this manner, collisions between the upstream data traffic transmitted by the ONUs 114 may be avoided.

In one or more implementations, in order to utilize the full bandwidth supported by the PON ports of the OLT MAC device 106, the switch device 104 and the OLT MAC device 106 may transmit upstream data traffic and/or downstream data traffic through the link 108 at a data rate that is at least equal to the aggregate data rate of the PON ports of the OLT MAC device 106. For example, if the OLT MAC device 106 supports a 1 Gbit/s (1 G) port and a 10 Gbit/s (10 G) port, then the switch device 104 and the OLT MAC device 106 may transmit upstream data traffic and/or downstream data traffic at a data rate of at least 11 Gbit/s. In this manner, the OLT 102 may, in one or more implementations, transmit data at the full link rates supported by the PON ports of the OLT MAC device 106.

However, the OLT MAC device 106 may not always be able to transmit downstream data over the PON ports (in aggregate) at the same rate as the rate of the link 108 between the switch device 104 and the OLT MAC device 106. For example, the OLT MAC device 106 may insert additional frames into the downstream data received from the switch device 104, such as multi-point control protocol (MPCP) frames, operations, administration and management (OAM) frames, etc., and/or the OLT MAC device 106 may apply encryption or forward error correction (FEC) to the downstream data, either of which may reduce the rate at which the OLT MAC device 106 can transmit downstream data. Similarly, the switch device 104 may not always be able to transmit upstream data to the uplink 112 at the same rate as the rate of the link 108 between the switch device 104 and the OLT MAC device 106. For example, the switch device 104 may encounter upstream congestion, such as when the uplink 112 is oversubscribed. Accordingly, in order to maximize the PON utilization while minimizing buffering within the OLT MAC device 106, the data rate between the switch device 104 and the OLT MAC device 106 is independently controlled in both the downstream and upstream directions.

In the downstream direction, the OLT MAC device 106 may transmit a congestion message to the switch device 104 when downstream congestion is occurring at any of the PON ports of the OLT MAC device 106. The congestion message may be indicative of the PON port that is experiencing the downstream congestion. In response to receiving the congestion message, the switch device 104 may reduce the rate of the downstream data traffic being transmitted over the link 108 to the OLT MAC device 106 for transmission over the indicated PON port, without changing the rate of the downstream data traffic being transmitted over the link 108 to the OLT MAC device 106 for transmission over the other PON ports. If the OLT MAC device 106 determines that the downstream congestion has been relieved at the indicated PON port, the OLT MAC device 106 may transmit a congestion relieved message to the switch device 104 that is indicative of the PON port for which the downstream congestion has been relieved. In response to receiving the congestion relieved message, the switch device 104 may then increase the rate of the downstream data traffic being transmitted over the link 108 to the OLT MAC device 106 for transmission over the indicated PON port without changing the rate of the downstream data traffic being transmitted over the link 108 to the OLT MAC device 106 for transmission over the other PON ports.

In the upstream direction, the switch device 104, or a processor that is communicatively coupled thereto, may transmit a congestion message to the OLT MAC device 106 when the switch device 104 is experiencing upstream congestion. In response to receiving the congestion message, the OLT MAC device 106 may reduce the scheduled upstream data traffic from the ONUs 114, such as by reducing the bandwidth allocations scheduled for the ONUs 114. If the switch device 104 determines that the upstream congestion has been relieved, the switch device 104 may transmit a congestion relieved message to the OLT MAC device 106 that indicates that the upstream congestion has been relieved. In response to receiving the congestion relieved message, the OLT MAC device 106 may increase the scheduled upstream data traffic from the ONUs 114, such as by increasing the bandwidth allocations scheduled for the ONUs 114.

Figure 2:
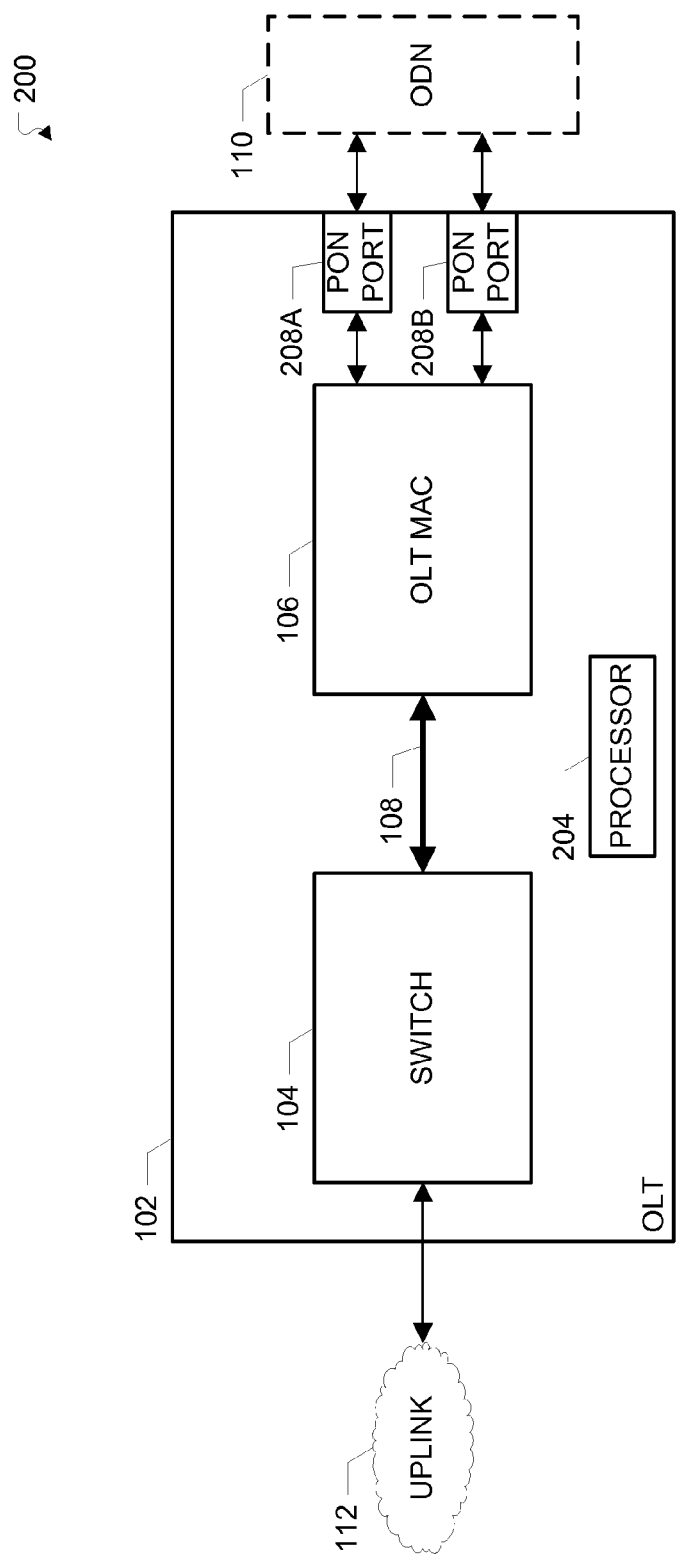
FIG. 2 illustrates an example network environment in which a system for data rate control in an optical line terminal may be implemented in accordance with one or more implementations.

FIG. 2 illustrates an example network environment 200 in which a system for data rate control in an optical line terminal 102 may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 200 includes a passive optical network (PON) environment, such as an Ethernet passive optical network (EPON), a gigabit passive optical network (GPON), or generally any PON. The network environment 200 includes an uplink 112, an OLT 102, and an ODN 110. The OLT 102 includes one or more processors 204, such as line card processors, host processors, or generally any other processors, one or more switch devices 104, one or more OLT MAC devices 106, one or more links 108 between the one or more switch devices 104 and the one or more OLT MAC devices 106, and one or more PON ports 208A-B. The switch device 104 and OLT MAC device 106 may be separate integrated circuits (ICs), separate pluggable modules, and/or separate line cards.

The OLT MAC device 106 may include memory, such as buffers, and a processor. The OLT MAC device 106 may handle tasks specific to the OLT implementation, such as EPON interface functions, EPON upstream bandwidth scheduling towards the switch device 104 with multiple levels of hierarchy, EPON diagnostic functions, and termination of EPON discovery and operations, administration and maintenance (OAM) traffic. The OLT MAC device 106 may be, for example, a flow-through device that does not perform any buffering other than burst management. The OLT MAC device 106 may be an EPON MAC device, a GPON MAC device, a mixed-function EPON/GPON device, or generally may perform OLT functionality associated with any passive optical network.

The switch device 104 may include memory, such as buffers, and a packet processor, a network processor, a general purpose processor, or generally any processor. The switch device 104 may handle the switching functionality for the OLT 102, such as flow classification, packet forwarding, packet modification, per flow queuing with deep packet buffer, and downstream bandwidth scheduling with multiple levels of hierarchy. In addition, the switch device 104 may also perform any other switching functions, such as participating in the IEEE 1588 precision time protocol. In one or more implementations, the switch device 104 may also include a multi-level upstream scheduler that schedules from the switch device 104 to the uplink 112. In this instance, the bandwidth of the EPON, and the upstream bandwidth, may be utilized as efficiently as possible since the switch device 104 can use its uplink scheduler to schedule traffic in an oversubscribed uplink scenario. In one or more implementations, the switch device 104 may be attached to multiple OLT MAC devices 106, such as an EPON OLT MAC device, and a GPON OLT MAC device, through separate links 108, such as Ethernet interfaces.

The link 108 between the switch device 104 and the OLT MAC device 106 may be an Ethernet interface, or generally any interface that can transmit signals between separate ICs and/or separate devices. The link 108 may be direct-mapped to an EPON optical fiber, or a set of EPON optical fibers, with throughput that can be contained within the link 108. The OLT 102 may also include an inband management channel across the link 108 between the devices that may allow communication between the internal central processing units (CPUs) of the switch device 104 and the OLT MAC device 106, and/or one or more of the processors 204, such as the host CPU, and/or a remote management CPU in the chassis hosting the devices 104, 106.

In operation, the OLT MAC device 106, or the processor 204, may map identifiers to the PON ports 208A-B that are supported by the OLT MAC device 106, such as numerical identifiers. The mappings of the identifiers may be communicated to both the OLT MAC device 106 and the switch device 104, as necessary. In one or more implementations, the switch device 104 and/or the OLT MAC device 106 may be configured, such as pre-configured, with the mappings of the identifiers to the PON ports 208A-B. The OLT MAC device 106, or the processor 204, may monitor the downstream congestion at the PON ports 208A-B. If the OLT MAC device 106 determines that downstream congestion exists at a PON port 208A, the OLT MAC device 106 may transmit a congestion message that includes an indication that the PON port 208A is experiencing downstream congestion, to the switch device 104. An example format of a congestion message is discussed further below with respect to FIG. 5.

In response to receiving the congestion message, the switch device 104 may reduce the downstream data traffic scheduled for the indicated PON port 208A independent of the downstream data traffic scheduled for the other PON port(s) 208B, e.g. the downstream data traffic scheduled for the other PON port(s) 208B may remain unchanged. If the OLT MAC device 106 determines that the downstream congestion at the PON port 208A has been relieved, the OLT MAC device 106 may transmit a congestion relieved message that includes an indication that the downstream congestion at the PON port 208A has been relieved, to the switch device 104. An example format of a congestion relieved message is discussed further below with respect to FIG. 5. In response to receiving the congestion relieved message, the switch device 104 may resume scheduling downstream data traffic for the indicated PON port 208A at the rate of the link 108, or may otherwise increase the data rate of downstream data traffic scheduled for the indicated PON port 208A.

The OLT MAC device 106 may utilize buffers that are associated with the PON ports 208A-B, such as first-in-first-out (FIFO) buffers, to determine when downstream congestion exists at the PON ports 208A-B. In one or more implementations, the FIFO buffers may be scaled to allow for jumbo frames (e.g. 10 kB). For example, the OLT MAC device 106 may buffer downstream data traffic for the PON port 208A into a FIFO buffer that is associated with the PON port 208A. The OLT MAC device 106 may continue to buffer downstream data traffic for the PON port 208A into the FIFO buffer until the amount of downstream data traffic stored in the FIFO buffer reaches an upper threshold level. If the amount of downstream data traffic stored in the FIFO buffer reaches the upper threshold level, the OLT MAC device 106 may transmit the congestion message to the switch device 104 that indicates that the PON port 208A is experiencing downstream congestion. In response to receiving the congestion message, the switch device 104 may reduce the data rate at which downstream data traffic is transmitted over the link 108 for transmission over the PON port 208A. Once the data rate of the downstream data traffic for the PON port 208A has been reduced, the OLT MAC device 106 may debuffer the downstream data traffic for the PON port 208A from the FIFO buffer. When the amount of downstream data traffic stored in the FIFO buffer reaches a lower threshold level, the OLT MAC device 106 may transmit the congestion relieved message to the switch device 104, that indicates that the downstream congestion on the PON 208A port has been relieved.

In one or more implementations, the identifiers that are mapped to the PON ports 208A-B may be equivalent to priority values, or class of service (CoS) values, that are utilized in one or more priority flow control systems, such as the priority values of 0 through 7 utilized in the Institute of Electrical and Electronics Engineers (IEEE) 802.3 priority flow control system. For example, if an OLT MAC device 106 supports two PON ports 208A-B, e.g. a 10 G PON Port 208A and 1 G PON port 208B, an identifier of 0 may be mapped to the 10 G PON port 208A, and an identifier of 1 may be mapped to the 1 G PON port 208B, or vice-versa. Since the values are used to identify the PON ports 208A-B, rather than to identify a priority associated with the PON ports 208A-B, the order in which the values are assigned to the PON ports 208A-B may be immaterial. However, since the identifiers mapped to the PON ports 208A-B are equivalent to priority values that are utilized in a priority flow control system, such as the IEEE 802.3 priority flow control system, the OLT MAC device 106 may utilize priority flow control messages of the priority flow control system to indicate downstream congestion on the PON ports 208A-B. An exemplary format of priority flow control messages used to indicate downstream congestion is discussed further below with respect to FIG. 5.

For example, if downstream congestion is being experienced on a 10 G PON port 208A that is mapped to an identifier of 0, the OLT MAC device 106 may transmit a priority flow control message to the switch device 104 that indicates that downstream data traffic having a priority level of 0 should be flow controlled. The switch device 104 may receive the priority flow control message, determine the PON port 208A that is mapped to the identifier of 0, and may reduce the data rate of the downstream data traffic transmitted over the link 108 for the PON port 208A. Thus, multiple distinct PON ports 208A-B may be independently controlled in the downstream direction on a common link 108 using a priority flow control system. The downstream flow control in an OLT 102 is discussed further below with respect to FIGS. 3 and 6.

In the upstream direction, the switch device 104, and/or the processor 204, may monitor the memory utilization of the switch device 104, e.g. in order to determine the amount of memory available for buffering upstream data traffic. If the memory utilization of the switch device 104 reaches an upper threshold level, the switch device 104 may transmit a congestion message to the OLT MAC device 106 that indicates that the switch device 104 is experiencing upstream congestion. In one or more implementations, the congestion message may be a flow control message, or a priority flow control message. In response to receiving the congestion message, the OLT MAC device 106 may reduce the bandwidth allocations scheduled for the ONUs 114, e.g. the DBA scheduler of the OLT MAC device 106 may reduce the bandwidth allocations scheduled for the ONUs 114. If the memory utilization of the switch device 104 reaches a lower threshold, the switch device 104 may transmit a congestion relieved message to the OLT MAC device 106 that indicates that the upstream congestion at the switch device 104 has been relieved. In one or more implementations, the congestion message may be a flow control message, or a priority flow control message. In response to receiving the congestion relieved message, the OLT MAC device 106 may increase the bandwidth allocations scheduled for the ONUs 114.

Since there may be a latency associated with scheduling bandwidth allocations for the ONUs 114 due to the amount of time required to transmit the bandwidth allocations to the ONUs 114, e.g. the fiber loop delay, and since the OLT MAC device 106 may not be able to buffer enough upstream data traffic to account for the latency, the upper threshold of the switch device 104 may be configured to account for the latency associated with scheduling the bandwidth allocations. In other words, the upper threshold of the switch device 104 may be configured such the switch device 104 may receive and buffer previously scheduled upstream data traffic after the upper threshold of the switch device 104 has been reached and/or after the priority flow control message has been transmitted from the switch device 104 to the OLT MAC device 106.

In one or more implementations, the DBA scheduler of the OLT MAC device 106 may schedule bandwidth allocations for the ONUs 114 for both committed traffic and excess traffic. Committed traffic may refer to the CIR traffic that may be guaranteed to be supported by the OLT 102, such as by a provider that is utilizing the OLT 102 to provide Internet service, while the excess traffic may refer to the EIR traffic that may be supported by the OLT 102 when bandwidth is available. In these one or more implementations, in response to receiving a congestion message from the switch device 104, the OLT MAC device 106 may first attempt to relieve the upstream congestion at the switch device 104 by reducing or eliminating any bandwidth allocations for excess upstream data traffic. In one or more implementations, if reducing or eliminating bandwidth allocations for excess upstream data traffic does not relieve the upstream congestion at the switch device 104, e.g. if the OLT MAC device 106 does not receive a congestion relieved message from the switch device 104, then the OLT MAC device 106 may start reducing scheduled bandwidth allocations for committed upstream data traffic. Alternatively, or in addition, the OLT MAC device 106 may start dropping packets from received committed upstream data traffic, rather than reducing bandwidth allocations for committed upstream data traffic. The upstream flow control in an OLT 102 is discussed further below with respect to FIGS. 4 and 7.

Figure 3:
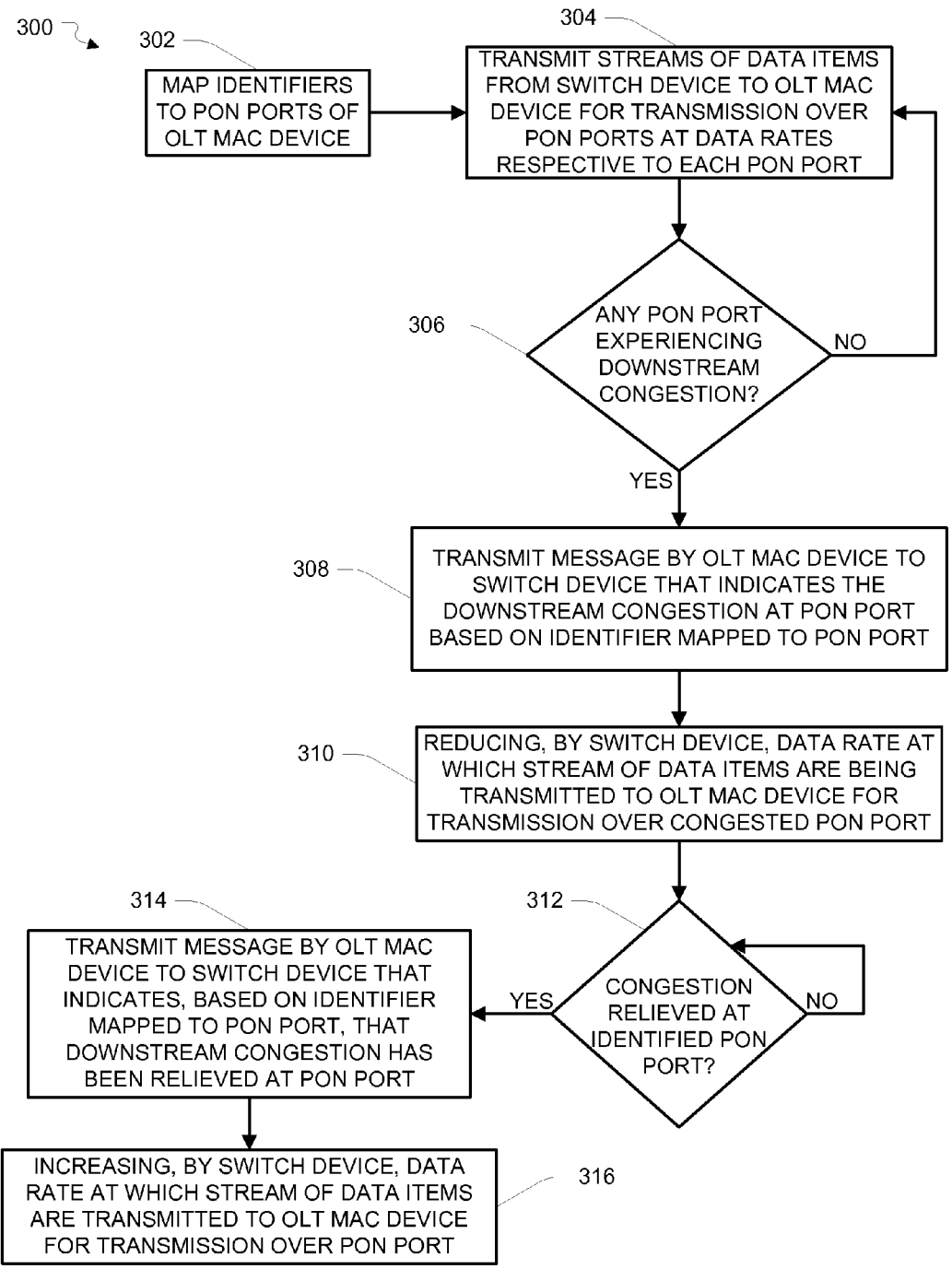
FIG. 3 illustrates a flow diagram of an example downstream flow control process of a system for data rate control in an optical line terminal in accordance with one or more implementations.

FIG. 3 illustrates a flow diagram of an example downstream flow control process 300 of a system for data rate control in an optical line terminal 102 in accordance with one or more implementations. For explanatory purposes, example process 300 is described herein with reference to the OLTs 102 of example network environments 100, 200 of FIGS. 1 and 2; however, example process 300 is not limited to the OLTs 102 of the example network environments 100, 200 of FIGS. 1 and 2. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

The OLT 102, or a processor 204 thereof, maps identifiers to the PON ports 208A-B of an OLT MAC device 106 of the OLT 102 (302), such as PON ports 208A-B coupled to the OLT MAC device 106. In one or more implementations, the identifiers may be equivalent to priority values, or class of service (CoS) values, that are utilized in one or more priority flow control systems, such as the priority values of 0 through 7 utilized in the Institute of Electrical and Electronics Engineers (IEEE) 802.3 priority flow control system. In one or more implementations, the mappings may be pre-configured, such as by a user.

A switch device 104 of the OLT 102 receives downstream data items from an uplink 112 and transmits streams of the downstream data items over the link 108 to the OLT MAC device 106 for transmission over the PON ports 208A-B (304). The streams of the downstream data items may be transmitted over the link 108 to the OLT MAC device 106 at data rates that are respective to the PON ports 208A-B over which the downstream data items are to be transmitted. For example, a stream of downstream data items that is transmitted over the link 108 to the OLT MAC device 106 for transmission over a 10 G PON port 208A may be transmitted at 1 Gbit/s, while a stream of downstream data items that is transmitted over the link 108 to the OLT MAC device 106 for transmission over a 1 G port 208B may be transmitted at 10 Gbit/s. The OLT MAC device 106 receives the streams of downstream data items from the switch device 104 and transmits the downstream data items over the respective PON ports 208A-B to the ONUs 114.

The OLT MAC device 106 determines whether any of the PON ports 208A-B is experiencing downstream congestion (306). In one or more implementations, the PON ports 208A-B may be associated with buffers that buffer downstream data items to be transmitted over the PON ports 208A-B. The OLT MAC device 106 may determine that a PON port 208A is experiencing downstream congestion when the amount of data stored in the associated buffer reaches an upper threshold value. If the OLT MAC device 106 determines that none of the PON ports 208A-B are experiencing downstream congestion (306), the OLT MAC device 106 continues to receive the streams of downstream data items from the switch device (304) and continues to transmit the downstream data items over the respective PON ports 208A-B to the ONUs 114.

If the OLT MAC device 106 determines that a PON port 208A is experiencing downstream congestion (306), the OLT MAC device 106 transmits a message to the switch device 104 that indicates that the PON port 208A is experiencing the downstream congestion based on the identifier mapped to the PON port 208A (308). For example, the OLT MAC device 106 may transmit a priority flow control message to the switch device 104, such as a priority flow control message utilized in the Institute of Electrical and Electronics Engineers (IEEE) 802.3 priority flow control system, that indicates that traffic should be flow controlled for the priority value that is equivalent to the identifier mapped to the PON port 208A.

In response to receiving the message, the switch device 104 reduces the data rate at which the stream of downstream data items is being transmitted to the OLT MAC device 106 for transmission over the PON port 208A that is experiencing the downstream congestion without changing the data rate at which the other streams of downstream data items are being transmitted to the OLT MAC device for transmission over the other PON port(s) 208B (310).

The OLT MAC device 106 determines whether the downstream congestion has been relieved at the PON port 208A (312). For example, the OLT MAC device 106 may determine that the downstream congestion has been relieved at the PON port 208A when the amount of data in the buffer associated with the PON port 208A has reached a lower threshold level. If the OLT MAC device 106 determines that the downstream congestion has not been relieved at the PON port 208A (312), the OLT MAC device 106 continues to receive the stream of downstream data items from the switch device 104 for transmission over the PON port 208A at the reduced data rate. In one or more implementations, the switch device 104 may reduce the data rate to 0, e.g. the switch device may stop transmitting the stream of downstream data items to the OLT MAC device 106 for transmission over the PON port 208A.

If the OLT MAC device 106 determines that the downstream congestion has been relieved at the PON port 208A (312), the OLT MAC device 106 transmits a message to the switch device 104 that indicates, based on the identifier mapped to the PON port 208A, that the downstream congestion has been relieved at the PON port 208A (314). For example, the OLT MAC device 106 may transmit a priority flow control message to the switch device 104, such as a priority flow control message utilized in the Institute of Electrical and Electronics Engineers (IEEE) 802.3 priority flow control system, that indicates that traffic should resume, e.g. not be flow controlled, for the priority value that is equivalent to the identifier mapped to the PON port 208A. In response to receiving the message, the switch device 104 increases the data rate at which the stream of downstream data items are being transmitted to the OLT MAC device 106 for transmission over the PON port 208A without changing the data rates at which other streams of downstream data items are being transmitted to the OLT MAC device 106 for transmission over other PON ports 208B (316).

Figure 4:
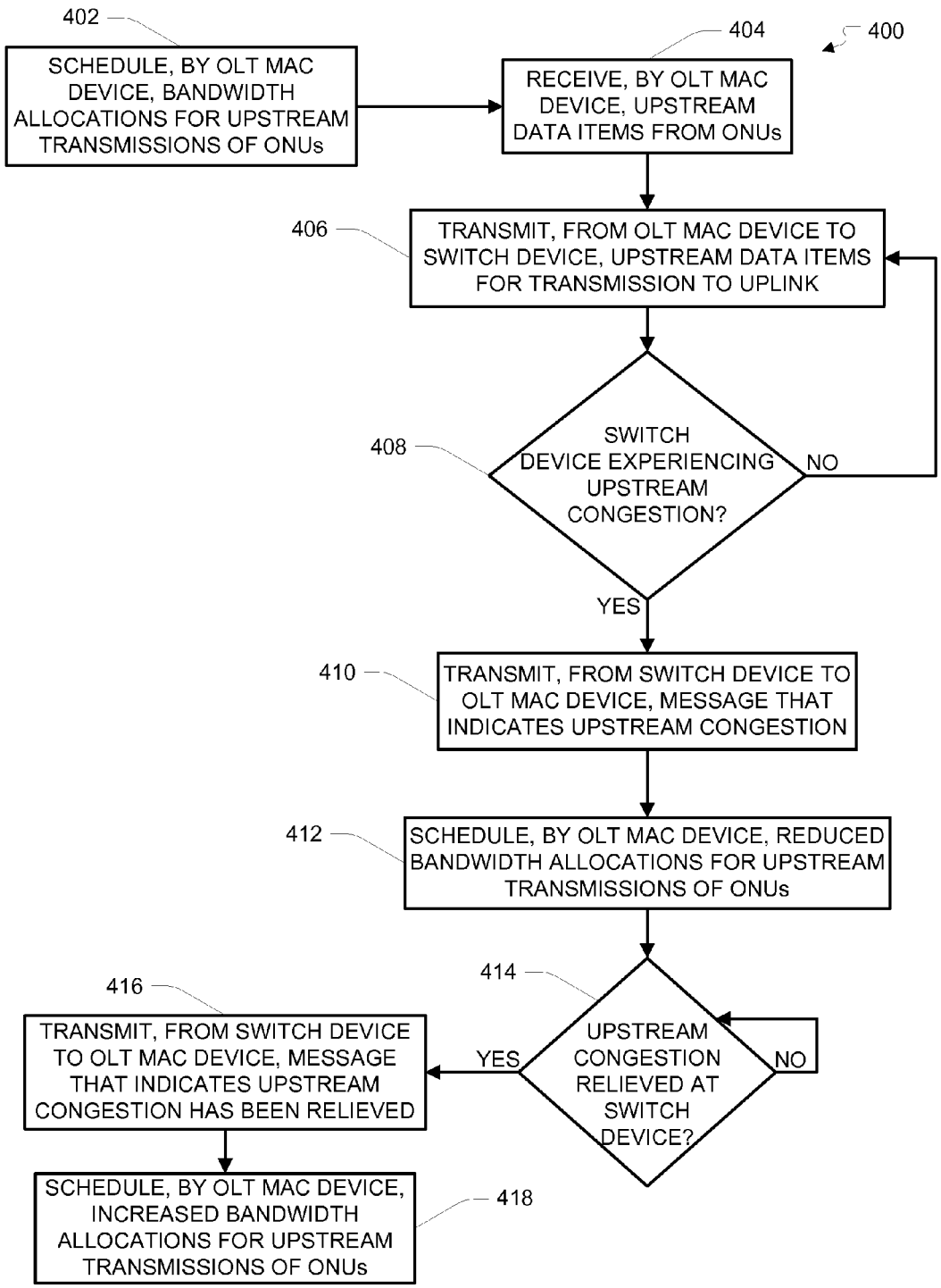
FIG. 4 illustrates a flow diagram of an example upstream flow control process of a system for data rate control in an optical line terminal in accordance with one or more implementations.

FIG. 4 illustrates a flow diagram of an example upstream flow control process 400 of a system for data rate control in an optical line terminal 102 in accordance with one or more implementations. For explanatory purposes, example process 400 is described herein with reference to the OLTs 102 of the example network environments 100, 200 of FIGS. 1 and 2; however, example process 400 is not limited to the OLTs 102 of the example network environments 100, 200 of FIGS. 1 and 2. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

The OLT MAC device 106 of the OLT 102, or a processor 204 coupled thereto, schedules bandwidth allocations for upstream transmissions of the ONUs 114 (402). For example, a dynamic bandwidth allocation (DBA) scheduler of the OLT MAC device 106 may allocate specific intervals of time during which the ONUs 114 may transmit upstream data items. Upon receiving the bandwidth allocations, the ONUs 114 may transmit upstream data items during the allocated time periods.

The OLT MAC device 106 receives the upstream data items from the ONUs 114 during the allocated time periods (404). The OLT MAC device 106 may transmit the upstream data items over the link 108 to the switch device 104 for transmission to the uplink 112 (406). The switch device 104 may receive the upstream data items from the OLT MAC device 106 and may transmit the upstream data items to the uplink 112. In one or more implementations, the switch device 104 may utilize a buffer, such as a shared buffer, to buffer the upstream data items received from the OLT MAC device 106. The switch device 104 may include a scheduler that schedules the upstream data items stored in the buffer for transmission to the uplink 112.

The switch device 104, or a processor 204 coupled thereto, determines whether the switch device 104 is experiencing upstream congestion (408). For example, the switch device 104, or the processor 204 coupled thereto, may determine whether the amount of data stored in the buffer of the switch device 104 has reached an upper threshold level. The upper threshold level may be set in view of the fiber loop delay between the OLT 102 and the ONUs 114, in order to account for the latency between transmitting reduced bandwidth allocations and the reduced bandwidth allocations taking effect. If the switch device 104, or a processor 204 coupled thereto, determines that the switch device 104 is not experiencing upstream congestion (408), the switch device 104 continues to receive upstream data items from the OLT MAC device 106 and transmits, or schedules for transmission, the upstream data items to the uplink 112 (406).

If the switch device 104, or a processor 204 coupled thereto, determines that the switch device 104 is experiencing upstream congestion (408), the switch device 104 transmits a message to the OLT MAC device 106 that indicates that the switch device 104 is experiencing the upstream congestion (410). In one or more implementations, the switch device 104 may transmit a priority flow control message to the OLT MAC device 106, such as a priority flow control message utilized in the Institute of Electrical and Electronics Engineers (IEEE) 802.3 priority flow control system.

In response to receiving the message from the switch device 104, the OLT MAC device 106 schedules reduced bandwidth allocations for the upstream transmissions of the ONUs 114 (412). In one or more implementations, the OLT MAC device 106 may only reduce or eliminate bandwidth allocations for excess traffic. The switch device 104, or a processor 204 coupled thereto, determines whether the upstream congestion has been relieved at the switch device 104 (414). For example, the switch device 104, or a processor 204 coupled thereto, may determine whether the amount of data stored in the buffer of the switch device 104 has reached a lower threshold level. If the switch device 104, or a processor 204 coupled thereto, determines that the upstream congestion has not been relieved at the switch device 104 (414), the switch device 104 continues to receive upstream data items from the OLT MAC device 106 based on the reduced bandwidth allocations and transmits, or schedules for transmission, the upstream data items to the uplink 112.

If the switch device 104, or a processor 204 coupled thereto, determines that the upstream congestion has been relieved at the switch device 104 (414), the switch device 104 transmits a message to the OLT MAC device 106 that indicates that the upstream congestion has been relieved at the switch device 104 (416). In one or more implementations, the switch device 104 may transmit a priority flow control message to the OLT MAC device 106, such as a priority flow control message utilized in the Institute of Electrical and Electronics Engineers (IEEE) 802.3 priority flow control system. In response to receiving the message from the switch device 104, the OLT MAC device 106 schedules increased bandwidth allocations for the upstream transmissions of the ONUs 114 (418), such as the bandwidth allocations that were scheduled for the upstream transmissions prior to the upstream congestion at the switch device 104.

Figure 5:
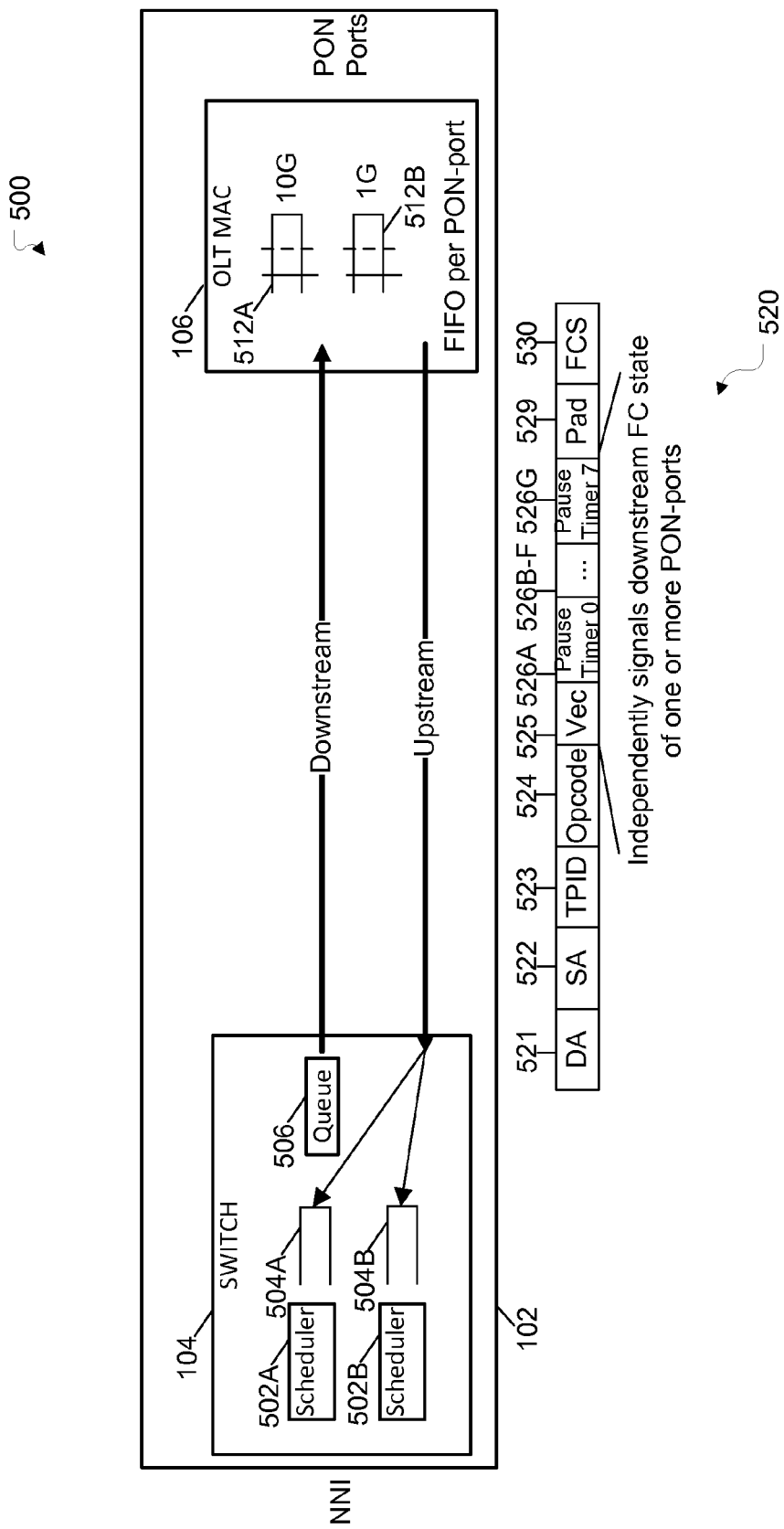
FIG. 5 illustrates a system for data rate control in an optical line terminal in accordance with one or more implementations.

FIG. 5 illustrates a system 500 for data rate control in an optical line terminal 102 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The system 500 includes the OLT 102 and a message format 520. The OLT 102 includes a switch device 104 and an OLT MAC device 106. The switch device 104 includes a downstream queue 506, one or more upstream queues 504A-B, and one or more upstream schedulers 502A-B. The OLT MAC device 106 includes a 10 G port queue 512A and a 1 G port queue 512B. The 10 G port queue 512A is associated with a 10 G PON port 208A, and the 1 G port queue 512B is associated with a 1 G PON port 208B, both of which may be coupled to ONUs 114. In one or more implementations, the queues 512A-B may be first-in-first-out (FIFO) buffers. The switch device 104 may be coupled to an uplink 112 through a network-to-network interface (NNI).

The message format 520 may be used to communicate upstream and downstream congestion between the switch device 104 and the OLT MAC device 106. The message format 520 includes a DA field 521 that may include a destination address, a SA field 522 that may include a source address, a TPID field 523 that may include an EtherType identifier, an opcode field 524 that may include an opcode, a vec field 525 that may include a vec value, a padding field 529 that may include padding (when necessary), a frame check sequence (FCS) field 530 that may include a cyclic redundancy check, and pause timer fields 0-7 526A-G that may include values that indicate whether upstream and/or downstream congestion is being experienced at the OLT 102.

In one or more implementations, the switch device 104 transmits a message to the OLT MAC device 106 using the message format 520. The message may include a value of 1 in any of the pause timer fields 0-7 526A-G to indicate that the switch device 104 is experiencing upstream congestion. Conversely, the message may include a value of 0 in all of the pause timer fields 0-7 526A-G to indicate that the switch device 104 is not experiencing upstream.

In one or more implementations, the OLT MAC device 106 transmits a message to the switch device 104 using the message format 520. As previously discussed, the PON ports 208A-B of the OLT MAC device 106 may be mapped to identifiers that correspond to the values of 0 through 7. If the OLT MAC device 106 is experiencing downstream congestion at a PON port 208A mapped to an identifier that has a value of 0, the OLT MAC device 106 may transmit a message to the switch device 104 using the message format 520 that includes a value greater than 0 in the pause timer 0 field 526A, and a value greater than 0 in any other pause timer 1-7 fields 526B-G that have an identifier, e.g. 1-7, that is mapped to a PON port 208A-B that is experiencing downstream congestion. Conversely, the pause timer 0-7 fields 526A-G that have an identifier, e.g. 0 through 7, that is mapped to a PON port 208A-B that is not experiencing downstream congestion may include a value of 0. Thus, upon receiving the message from the OLT MAC device 106, the switch device 104 may determine which individual PON ports 208A-B are experiencing (or not experiencing downstream congestion) based on the values of the pause timer 0-7 fields 526A-G.

Figure 6:
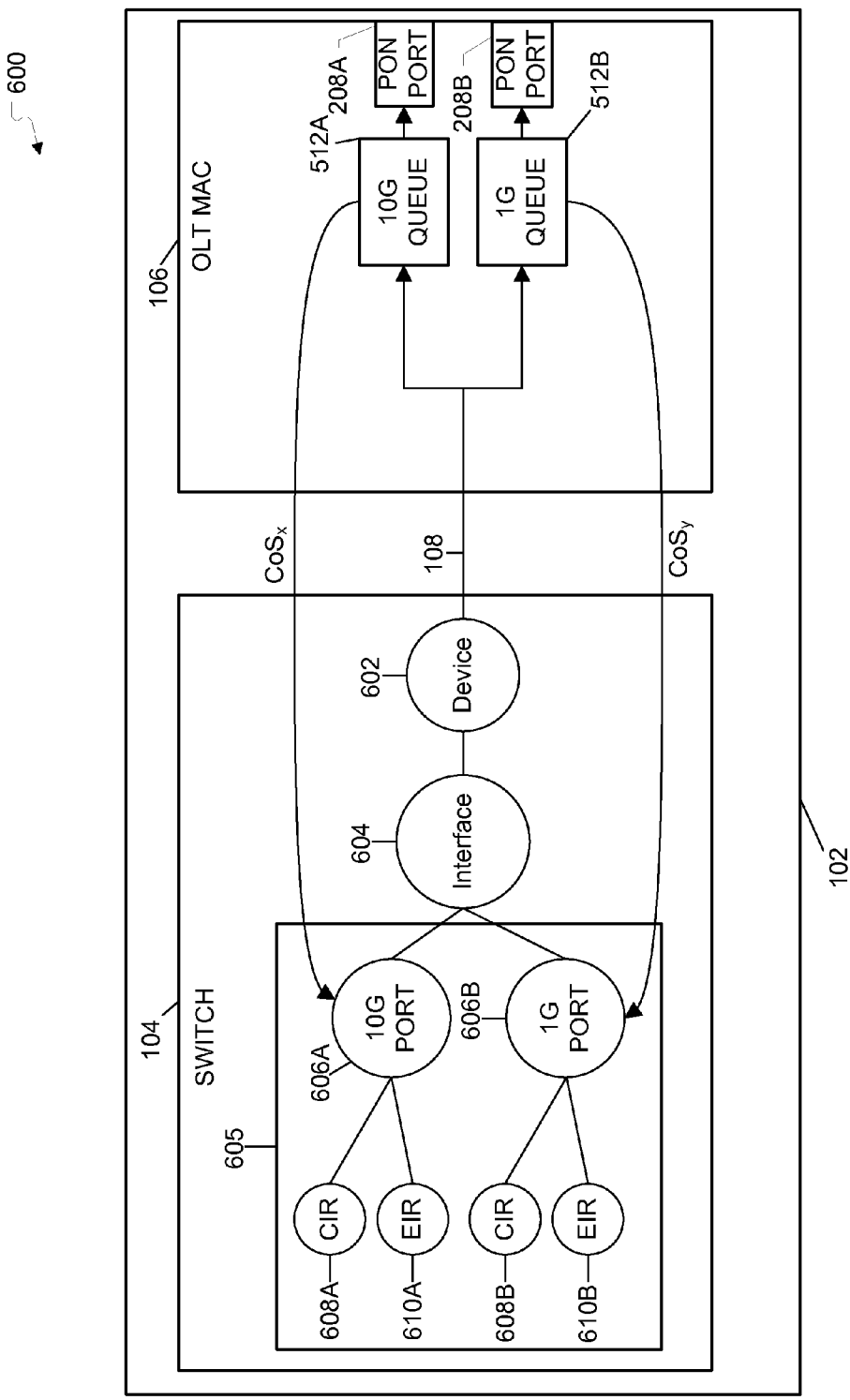
FIG. 6 illustrates a system for downstream flow control in an optical line terminal in accordance with one or more implementations.

FIG. 6 illustrates a system 600 for downstream flow control in an optical line terminal 102 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The system 600 includes an OLT 102. The OLT 102 includes a switch device 104 and an OLT MAC device 106 that are communicatively coupled through a link 108. The OLT MAC device 106 includes a 10 G port queue 512A and a 1 G port queue 512B. The 10 G port queue 512A may be associated with a 10 G PON port 208A, and the 1 G port queue 512B may be associated with a 1 G PON port 208B, both of which may be coupled to one or more ONUs 114. In one or more implementations, the queues 512A-B may be first-in-first-out (FIFO) buffers. The OLT MAC device 106 may buffer downstream data items intended for transmission over the 10 G PON port 208A in the 10 G port queue 512A, and the OLT MAC device 106 may buffer downstream data items that are intended for transmission over the 1 G PON port 208B in the 1 G port queue 512B.

The switch device 104 may include a device 602, such as for transmitting data over the link 108 to the OLT MAC device 106, an interface 604, such as an interface for accessing the buffer 605, and a buffer 605, such as a buffer for buffering downstream data items for transmission over the link 108 to the OLT MAC device 106. The buffer 605 may logically be separated into one or more queues, such as a 10 G port queue 606A and a 1 G port queue 606B. The switch device 104 may queue downstream data items that are intended for transmission over 10 G PON port 208A in the 10 G port queue 606A, and the switch device 104 may queue downstream data items that are intended for transmission over the 1 G PON port 208B in the 1 G port queue 606B.

The queues 606A-B may be further logically divided between CIR traffic queues 608A-B and EIR traffic queues 610A-B. Thus, the switch device 104 may buffer the CIR traffic intended for transmission over the 10 G PON port 208A in the CIR traffic queue 608A, and the switch device may buffer the EIR traffic intended for transmission over the 10 G PON port 208A in the EIR traffic queue 610A. Similarly, the switch device 104 may buffer the CIR traffic intended for transmission over the 1 G PON port 208B in the CIR traffic queue 608B, and the switch device 104 may buffer the EIR traffic intended for transmission over the 1 G PON port 208B in the EIR traffic queue 610B.

In one or more implementations, the switch device 104 may store mappings between destination addresses and LLIDs and the PON ports 208A-B that service the LLIDs. The switch device 104 may utilize these mappings to queue the downstream data items in the appropriate traffic queues 608A-B, 610A-B. For example, the OLT MAC device 106 may append a tag, such as a VLAN tag, to an upstream data item that is communicated over the link 108 to the switch device 104. The tag may be indicative of the LLID associated with the upstream data item and the PON port 208A over which the upstream data item was received. The switch device 104 may store a mapping between the source address of the upstream data item and the LLID and PON port 208A indicated by the tag. Thus, when the switch device 104 receives a downstream data item, the switch device 104 may determine the LLID associated with the downstream data item, and the PON port 208A over which the downstream data item is to be transmitted, based on the destination address of the downstream data item (which correlates to the source address of an upstream data item). In one or more implementations, the switch device 104 may remove and store the tag before transmitting an upstream data item to the uplink 112, and the switch device may append the appropriate tag to a downstream data item, e.g. based on the destination address, before transmitting the downstream data item over the link 108 to the OLT MAC device 106.

In operation, the switch device 104 may transmit streams of downstream data items over the link 108 to the OLT MAC device 106 for transmission over the PON ports 208A-B. For example, the switch device 104 may transmit a stream of downstream data items for transmission over the 10 G PON port 208A and a separate stream of downstream data items for transmission over the 1 G PON port 208B. The streams may be transmitted at different data rates, e.g. the stream of downstream data items for transmission over the 10 G PON port 208A may be transmitted at 10 Gbit/s, while the stream of downstream data items for transmission over the 1 G PON port 208B may be transmitted at 1 Gbit/s. The PON ports 208A-B may each be mapped to an identifier, such as value from 0 through 7. The OLT MAC device 106 may buffer the downstream data items in the queues 512A-B for transmission over the PON ports 208A-B.

If the OLT MAC device 106 determines that the amount of downstream data items buffered in any of the queues 512A-B, such as the queue 512A, reaches an upper threshold level, the OLT MAC device 106 may transmit a message to the switch device 104 that includes an indication that the PON port 208A is experiencing downstream congestion. Upon receiving the message from the OLT MAC device 106, the switch device 104 may reduce the data rate of the stream of downstream data items being transmitted over the link 108 for transmission over the PON port 208A that is experiencing the downstream congestion, without changing the data rates of the streams of downstream data items being transmitted over the link 108 for transmission over other PON port(s) 208B. In one or more implementations, the OLT MAC device 106 may include, or may be associated with, more than two PON ports 208A-B. For example, the OLT MAC device 106 may include, or may be associated with eight 1 G PON ports.

If the OLT MAC device 106 determines that the amount of downstream data items buffered in the queue 512A has dropped below a lower threshold level, the OLT MAC device 106 may transmit a message to the switch device 104 that indicates that the downstream congestion has been relieved at the PON port 208A. Upon receiving the message from the OLT MAC device 106, the switch device 104 may increase the data rate of the stream of downstream data items being transmitted over the link 108 for transmission over the PON port 208A without changing the data rate of any the streams of downstream data items being transmitted over the link 108 for transmission over any of the other PON port(s) 208B. For example, the switch device 104 may increase the data rate of to the rate at which the stream of downstream data items was being transmitted over the link 108 before the PON port 208A started experiencing downstream congestion.

Figure 7:
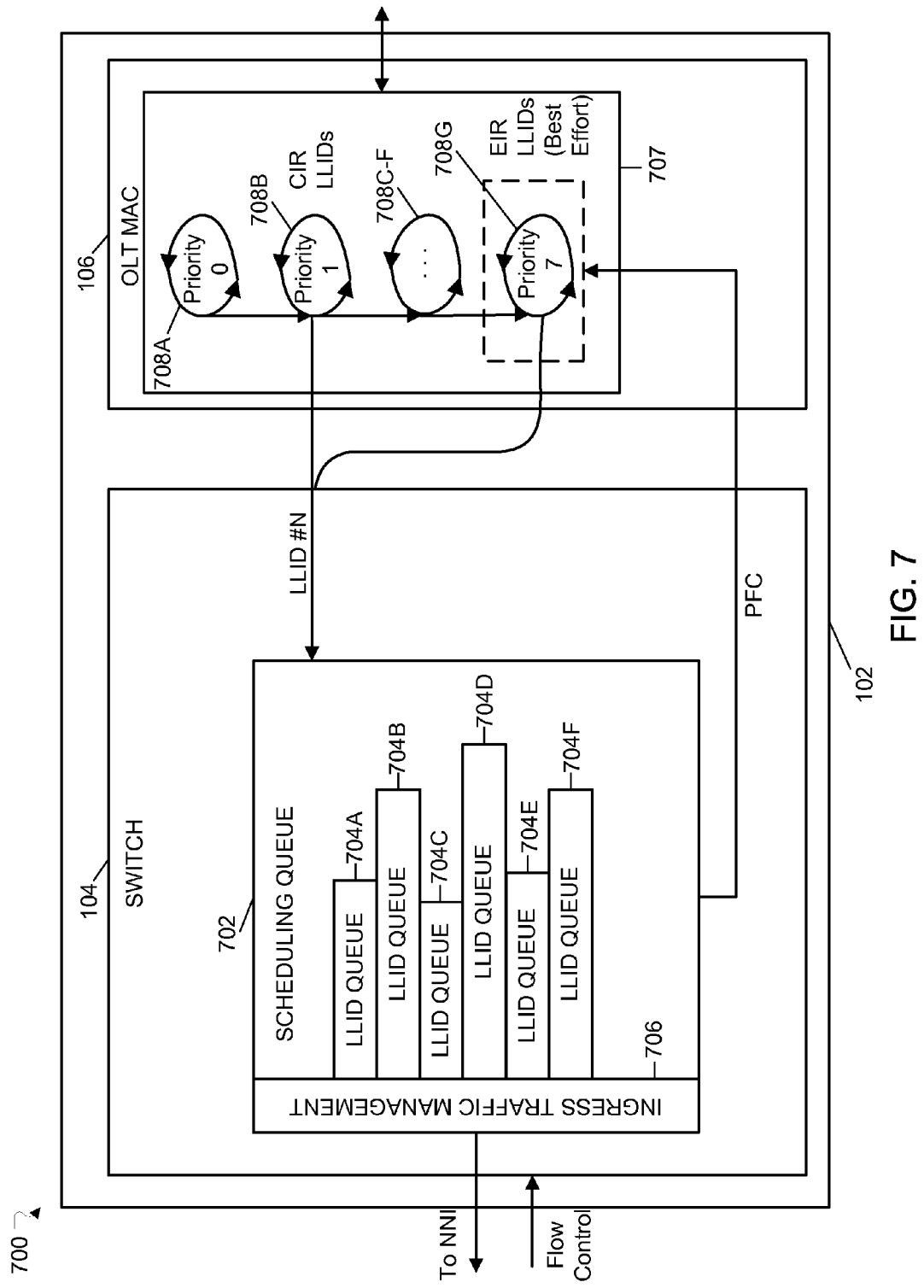
FIG. 7 illustrates a system for upstream flow control in an optical line terminal in accordance with one or more implementations.

FIG. 7 illustrates a system 700 for upstream flow control in an optical line terminal 102 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The system 700 may include an OLT 102. The OLT 102 may include a switch device 104 and an OLT MAC device 106. The switch device 104 may include an upstream queue 702 that is coupled to an ingress traffic management module 706. The upstream queue 702 may include LLID queues 704A-F. The LLID queues 704A-F may store upstream data items corresponding to one or more LLIDs. The amount of memory allocated to the LLID queues 704A-F may be dynamically reconfigurable, within the limits of the available memory of the upstream queue 702.

The OLT MAC device 106 may include a scheduler 707, such as a dynamic bandwidth allocation (DBA) scheduler. The scheduler 707 may logically separate the bandwidth allocations between priorities 708A-G of the LLIDs associated with the upstream data traffic. For example, the bandwidth allocations for LLIDs that are associated with CIR traffic may correspond to priorities 708A-F, and the bandwidth allocations for LLIDs that are associated with EIR traffic may correspond to priority 708G. In one or more implementations, there may be other allocations of the priorities to the classes of traffic supported by the PON.

In operation, the OLT MAC device 106 may schedule bandwidth allocations for upstream transmissions from the ONUs 114. The OLT MAC device 106 may receive upstream data items from the ONUs 114 in accordance with the scheduled bandwidth allocations. The OLT MAC device 106 may transmit the upstream data items over the link 108 to the switch device 104. The switch device 104 may buffer the upstream data items, as necessary, in the upstream queue 702. The ingress traffic management module 706 may schedule the upstream data items for transmission to the uplink 112.

The switch device 104 may dynamically modify the amount of memory allocated to any of the LLID queues 704A-F in order to substantially maximize the utilization of the available memory in the upstream queue 702. However, if the switch device 104, or a processor coupled thereto, determines that the memory utilization of the upstream queue 702 reaches an upper threshold level, the switch device 104 may transmit a message to the OLT MAC device 106 that indicates that the switch device 104 is experiencing upstream congestion. In response to receiving the message, the OLT MAC device 106 may schedule reduced bandwidth allocations for the ONUs 114. The upper threshold level may be configured to account for the fiber loop delay in transmitting the reduced bandwidth allocations to the ONUs 114 in order to substantially minimize, or eliminate, any buffering of upstream data items in the OLT MAC device 106. For example, the upper threshold level may be set such that the upstream queue 702 has enough memory available to receive and buffer any already scheduled transmissions.

If the switch device 104, or a processor coupled thereto, determines that the memory utilization of the upstream queue 702 reaches a lower threshold level, the switch device 104 may communicate a message to the OLT MAC device 106 that indicates that the upstream congestion has been relieved at the switch device 104. In response to receiving the message, the OLT MAC device 106 may schedule increased bandwidth allocations for the ONUs 114, such as the bandwidth allocations that were scheduled for the ONUs 114 before the switch device 104 experienced the upstream congestion.

Figure 8:
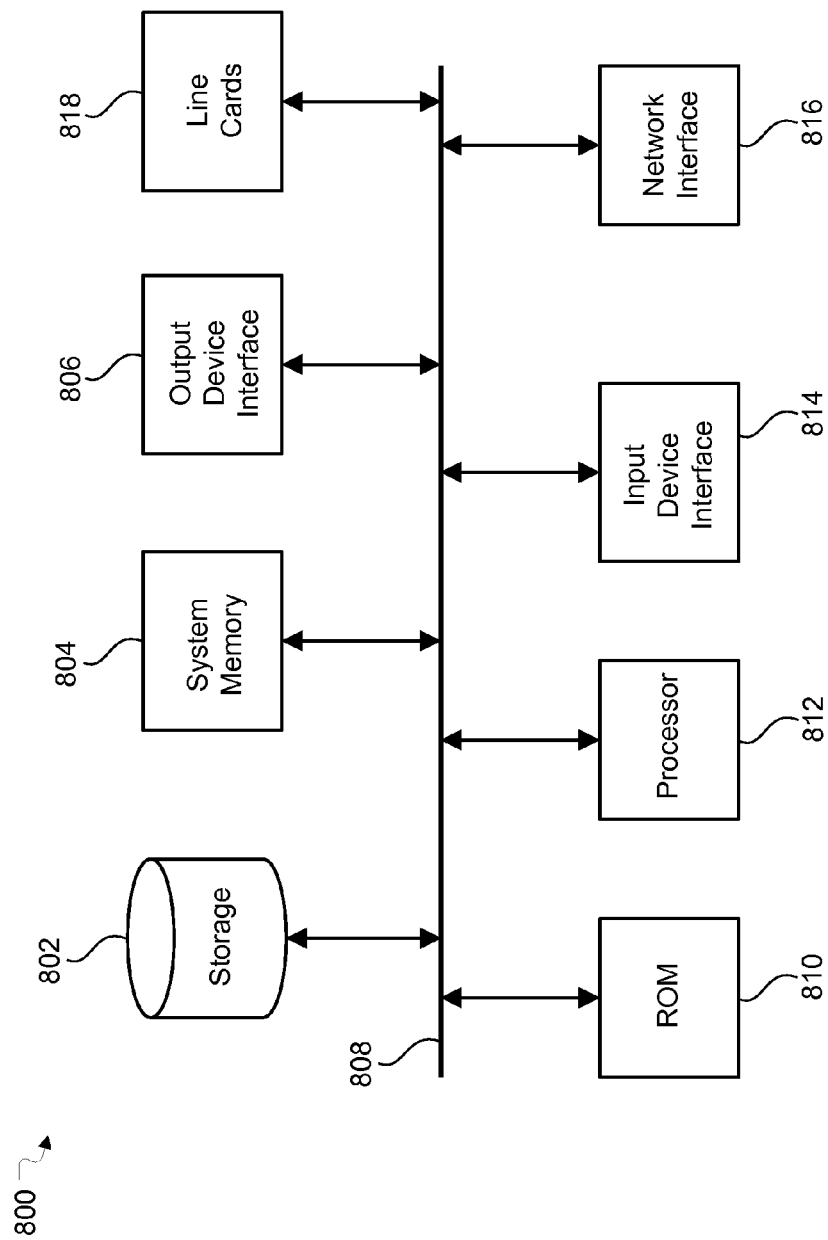
FIG. 8 conceptually illustrates an electronic system with which any implementations of the subject technology are implemented.

FIG. 8 conceptually illustrates an electronic system 800 with which any implementations of the subject technology are implemented. The electronic system 800, for example, can be a desktop computer, a laptop computer, a tablet computer, a server, a switch, a router, a base station, a receiver, a phone, a personal digital assistant (PDA), any device that can be implemented in an optical line terminal 102, or generally any electronic device that transmits signals over a network. Such an electronic system includes various types of computer readable media and interfaces for various other types of computer readable media. Electronic system 800 includes bus 808, processing unit(s) 812, system memory 804, read-only memory (ROM) 810, permanent storage device 802, input device interface 814, output device interface 806, network interface 816, and one or more line cards 818, or subsets and variations thereof.

Bus 808 collectively represents all system, peripheral, and chipset buses that communicatively connect the numerous internal devices of electronic system 800. In one or more implementations, bus 808 communicatively connects processing unit(s) 812 with ROM 810, system memory 804, and permanent storage device 802. From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of the electronic system. Permanent storage device 802, on the other hand, is a read-and-write memory device. This device is a non-volatile memory unit that stores instructions and data even when electronic system 800 is off. One or more implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such as random access memory. System memory 804 stores any of the instructions and data that processing unit(s) 812 needs at runtime. In one or more implementations, the processes of the subject disclosure are stored in system memory 804, permanent storage device 802, and/or ROM 810. From these various memory units, processing unit(s) 812 retrieves instructions to execute and data to process in order to execute the processes of one or more implementations.

Bus 808 also connects to input and output device interfaces 814 and 806. Input device interface 814 enables a user to communicate information and select commands to the electronic system. Input devices used with input device interface 814 include, for example, alphanumeric keyboards and pointing devices (also called "cursor control devices"). Output device interface 806 enables, for example, the display of images generated by electronic system 800. Output devices used with output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Bus 808 also couples to one or more line cards 818. The line cards 818 may include a line card 818 that includes a switch IC and/or a line card 818 that includes an OLT MAC IC. In one or more implementations, a single line card 818 may include separate switch and OLT MAC ICs.

Finally, as shown in FIG. 8, bus 808 also couples electronic system 800 to a network (not shown) through network interface 816. In this manner, the computer can be a part of a network of computers (such as a local area network ("LAN"), a wide area network ("WAN"), or an Intranet, or a network of networks, such as the Internet. Any or all components of electronic system 800 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A non-transitory machine-readable medium embodying instructions that, when executed by a machine, allow the machine to perform a method comprising:
   scheduling, by a first device of an OLT, a first plurality of bandwidth allocations for upstream transmissions of a plurality of optical network units (ONUs) over a plurality of passive optical network (PON) ports;
   receiving, by the first device and from the plurality of ONUs over the plurality of PON ports, a plurality of upstream data items based at least in part on at least one of the first plurality of bandwidth allocations;
   transmitting, by the first device over a common link to a second device of the OLT, the plurality of upstream data items received over the plurality of PON ports for transmission to an uplink;
   receiving, by the first device from the second device over the common link used to transmit the plurality of upstream data items to the second device, a first control message that indicates that the second device is experiencing upstream congestion; and
   scheduling, by the first device and in response to receiving the first control message, a second plurality of bandwidth allocations for the upstream transmissions of the plurality of optical network units (ONUs), wherein the second plurality of bandwidth allocations are less in aggregate than the first plurality of bandwidth allocations.

2. The non-transitory machine-readable medium of claim 1, wherein the method further comprises:
   determining that the second device is experiencing upstream congestion based at least in part on a memory utilization of the second device reaching an upper threshold;
   determining that the upstream congestion at the second device has been relieved based at least in part on the memory utilization of the second device reaching a lower threshold;
   when the upstream congestion has been relieved at the second device, transmitting, by the second device over the link to the first device, a second control message that indicates that the upstream congestion at the second device has been relieved; and
   scheduling, by the second device and in response to receiving the second control message, the first plurality of bandwidth allocations for the upstream transmissions of the plurality of optical network units (ONUs).

3. The non-transitory machine-readable medium of claim 2, wherein at least one of the first control message or the second control message comprises a priority flow control message.

4. The non-transitory machine-readable medium of claim 1, wherein the first plurality of bandwidth allocations comprises a first plurality of committed traffic allocations and a first plurality of excess traffic allocations, and the second plurality of bandwidth allocations comprises a second plurality of committed traffic allocations and a second plurality of excess traffic allocations, wherein the second plurality of committed traffic allocations is equivalent to the first plurality of committed traffic allocations and the second plurality of excess traffic allocations is less in aggregate than the first plurality of excess traffic allocations.

5. The non-transitory machine-readable medium of claim 1, the method further comprising:

mapping a first identifier to a first passive optical network (PON) port of the first device of the OLT and a second identifier to a second PON port of the first device of the OLT;

transmitting, by the second device of the OLT and to the first device at a first data rate, a first plurality of downstream data items for transmission over the first PON port;

transmitting, by the second device to the first device at a second data rate, a second plurality of downstream data items for transmission over the second PON port;

determining, by the first device, whether the first PON port or the second PON port is experiencing downstream congestion;

when the first PON port is experiencing the downstream congestion, transmitting, by the first device and to the second device, a first message that comprises an indication of the downstream congestion at the first PON port based on the mapping of the first identifier to the first PON port; and reducing, by the second device and in response to receiving the first message, the first data rate at which the first plurality of downstream data items are transmitted from the second device to the first device, wherein the first data rate is reduced independent of the second data rate.

6. The non-transitory machine-readable medium of claim 5, wherein the first PON port is associated with a first buffer and the second PON port is associated with a second buffer, and the determining, by the first device, whether the first PON port or the second PON port is experiencing the downstream congestion further comprises:

determining, by the first device, that the first PON port is experiencing the downstream congestion when a first amount of data stored in the first buffer associated with the first PON port reaches a first upper threshold level; and determining, by the first device, that the second PON port is experiencing the downstream congestion when a second amount of data stored in the second buffer associated with the second PON port reaches a second upper threshold level.

7. The non-transitory machine-readable medium of claim 5, wherein the method further comprises:

when the second PON port is experiencing the downstream congestion, transmitting, by the first device and to the second device, a second message that comprises an indication of the downstream congestion at the second PON port based on the mapping of the second identifier to the second PON port; and reducing, by the second device and in response to receiving the second message, the second data rate at which the second plurality of downstream data items are transmitted from the second device to the first device, wherein the second data rate is reduced independent of the first data rate.

8. The non-transitory machine-readable medium of claim 5, wherein the method further comprises:

determining, by the first device, whether the downstream congestion has been relieved at the first PON port;

when the downstream congestion has been relieved at the first PON port, transmitting, by the first device and to the second device, a second message that comprises an indication that the downstream congestion has been relieved at the first PON port based on the mapping of the first identifier to the first PON port; and increasing, by the second device and in response to receiving the second message, the first data rate at which the first plurality of downstream data items are transmitted from the second device to the first device, wherein the first data rate is increased independent of the second data rate.

9. The non-transitory machine-readable medium of claim 8, wherein the first PON port is associated with a buffer, and the determining, by the first device, whether the downstream congestion has been relieved at the first PON port further comprises:

determining, by the first device, that the downstream congestion has been relieved at the first PON port when an amount of data stored in the buffer associated with the first PON port reaches a lower threshold level.

10. The non-transitory machine-readable medium of claim 9, wherein the first identifier and the second identifier each comprises one of a plurality of priority values.

11. The method of claim 1, wherein the first control message is transmitted over the link on an inband management channel.

12. The method of claim 1, further comprising:

after the first control message that indicates that the second device is experiencing the upstream congestion is received by the first device:

receiving, by the first device, one or more remaining upstream data items associated with one or more of the first plurality of bandwidth allocations; and transmitting, by the first device over the link to the second device, the one or more remaining upstream data items.

13. A method comprising:

scheduling, by a first device of an OLT, a first plurality of bandwidth allocations for upstream transmissions of a plurality of optical network units (ONUs);

receiving, by the first device and from the plurality of ONUs over a plurality of passive optical network (PON) ports, a plurality of upstream data items based at least in part on at least one of the first plurality of bandwidth allocations;

transmitting, by the first device and to a second device of the OLT over a single Ethernet interface, the plurality of upstream data items for transmission to an uplink;

determining whether the second device is experiencing upstream congestion based at least in part on whether a memory utilization of the second device reaches an upper threshold;

when the second device is experiencing the upstream congestion, transmitting, by the second device and to the first device, a first message that indicates that the second device is experiencing the upstream congestion; and scheduling, by the first device and in response to receiving the first message, a second plurality of bandwidth allocations for the upstream transmissions of the plurality of ONUs, wherein the second plurality of bandwidth allocations are less in aggregate than the first plurality of bandwidth allocations, wherein the upper threshold is configured to account for a latency between the second plurality of bandwidth allocations being scheduled and the second plurality of bandwidth allocations taking effect at the plurality of ONUs.

14. The method of claim 13, further comprising:

determining that the upstream congestion at the second device has been relieved based at least in part on the memory utilization of the second device reaching a lower threshold;

when the upstream congestion has been relieved at the second device, transmitting, by the second device and to the first device, a second message that indicates that the upstream congestion at the second device has been relieved; and scheduling, by the second device and in response to receiving the second message, the first plurality of bandwidth allocations for the upstream transmissions of the plurality of optical network units (ONUs).

15. A system comprising:

a switch device configured to:
  receive upstream data items from a collocated OLT MAC device over a single Ethernet interface and transmit the upstream data items to an uplink, wherein the data items are received by the OLT MAC device over passive optical network (PON) ports;
  determine when upstream congestion is occurring; and
  transmit, to the OLT MAC device over the single Ethernet interface, a first control message that indicates that the switch device is experiencing the upstream congestion when the upstream congestion is occurring; and the OLT MAC device coupled to the PON ports, the OLT MAC device communicatively coupled to the switch device via the single Ethernet interface, and the OLT MAC device configured to:
  schedule first bandwidth allocations for first upstream transmissions of first optical network units (ONUs) over a first PON port of the PON ports and second bandwidth allocations for second upstream transmissions of second ONUs over a second PON port of the PON ports;
  receive, from at least one of the first ONUs over the first PON port, first upstream data items based at least in part on at least one of the first bandwidth allocations, and, from at least one of the second ONUs over the second PON port, second upstream data items based at least in part on at least one of the second bandwidth allocations;
  transmit, to the switch device over the single Ethernet interface, the first and second upstream data items for transmission to the uplink; and
  schedule, in response to receiving the first control message over the single Ethernet interface, third bandwidth allocations for the first upstream transmissions of the first ONUs over the first PON port and fourth bandwidth allocations for the second upstream transmissions of the second ONUs over the second PON port, wherein the third bandwidth allocations are less in aggregate than the first bandwidth allocations, and the fourth bandwidth allocations are less in aggregate than the second bandwidth allocations.

16. The system of claim 15, wherein the first PON port of the PON ports is associated with a different bandwidth than the second PON port of the PON ports.

17. The system of claim 15, wherein the switch device is further configured to transmit the first control message to the OLT MAC device over the Ethernet interface on an inband management channel.

18. The system of claim 15, wherein the first bandwidth allocations differ from the second bandwidth allocations and the fourth bandwidth allocations differ from the third bandwidth allocations.

19. The system of claim 15, further comprising:
a bus coupled to a central processing unit;
a first line card comprising a first integrated circuit that includes the switch device, the first line card coupled to the bus; and
a second line card comprising a second integrated circuit that includes OLT MAC device, the second line card coupled to the bus.

20. The system of claim 15, further comprising:
a bus coupled to a central processing unit; and
a line card comprising a first integrated circuit including the switch device and a second integrated circuit including the OLT MAC device, the line card coupled to the bus.

* * * * *